United States Patent
Ballal et al.

(10) Patent No.: US 12,479,158 B2
(45) Date of Patent: Nov. 25, 2025

(54) SHORT-LENGTH AND EFFICIENT LIQUID COOLED DISPENSER

(71) Applicant: FABHEADS AUTOMATION PRIVATE LIMITED, Kottivakkam (IN)

(72) Inventors: Akshay Ballal, Semencherry (IN); Dhinesh Kanagaraj, Thoraipakkam (IN)

(73) Assignee: FABHEADS AUTOMATION PRIVATE LIMITED, Kottivakkam (IN)

( * ) Notice: Subject to any disclaimer, the term of this patent is extended or adjusted under 35 U.S.C. 154(b) by 5 days.

(21) Appl. No.: 17/624,271

(22) PCT Filed: Mar. 10, 2021

(86) PCT No.: PCT/IN2021/050228
§ 371 (c)(1),
(2) Date: Dec. 31, 2021

(87) PCT Pub. No.: WO2021/199061
PCT Pub. Date: Oct. 7, 2021

(65) Prior Publication Data
US 2023/0249402 A1    Aug. 10, 2023

(30) Foreign Application Priority Data
Apr. 1, 2020  (IN) .............................. 202041014588

(51) Int. Cl.
*B29C 64/209*  (2017.01)
*B29B 13/02*  (2006.01)
(Continued)

(52) U.S. Cl.
CPC .......... *B29C 64/209* (2017.08); *B29B 13/022* (2013.01); *B29B 13/04* (2013.01); *B29C 64/118* (2017.08); *B29C 64/321* (2017.08); *B29C 64/393* (2017.08); *B33Y 30/00* (2014.12); *B33Y 40/10* (2020.01); *B33Y 50/02* (2014.12)

(58) Field of Classification Search
CPC ... B29C 64/209; B29C 64/321; B29C 64/118; B29C 64/393; B29B 13/022; B29B 13/04; B33Y 30/00; B33Y 40/10; B33Y 50/02
See application file for complete search history.

(56) References Cited

U.S. PATENT DOCUMENTS 10,415,898 B1 *  9/2019  Sunden .................... B22F 12/53
2017/0014906 A1 *  1/2017  Ng ......................... B29C 64/364

FOREIGN PATENT DOCUMENTS

CN      108501374 A    9/2018

* cited by examiner

*Primary Examiner* — JaMel M Nelson
*Assistant Examiner* — Erica Hartsell Funk
(74) *Attorney, Agent, or Firm* — Jose Cherson Weissbrot

(57) ABSTRACT

A dispenser (100) for manufacturing an object is provided herein. The dispenser (100) includes a material feed portion (108) configured to provide a printing material. The dispenser (100) further includes a cold end portion (104) configured to cool down temperature of the printing material. The system further includes a coolant source (304) configured to use a liquid as coolant and provide cooling to the printing material. The dispenser (100) further includes a hot end portion (102) configured to convert printing material into a molten form and output the printing material for printing via a dispenser outlet (116).

13 Claims, 10 Drawing Sheets

(51) Int. Cl.
*B29B 13/04* (2006.01)
*B29C 64/118* (2017.01)
*B29C 64/321* (2017.01)
*B29C 64/393* (2017.01)
*B33Y 30/00* (2015.01)
*B33Y 40/10* (2020.01)
*B33Y 50/02* (2015.01)

Coolant Cycle

SHORT-LENGTH AND EFFICIENT LIQUID COOLED DISPENSER

FIELD OF THE INVENTION

Embodiments of the present invention generally relate to a dispenser, and in particular relate to a liquid cooled dispenser.

BACKGROUND

An extruder is a part of a three dimensional (3D) printer that dispenses the raw material onto the build surface. The extruder melts the material in its hot end and then extrudes the material out of the nozzle to the build surface. Usually, the extruders perform rapid prototyping of three-dimensional objects by selectively extruding a molten thermoplastic from an extrusion head while moving the extrusion head in three dimensions with respect to a base. Movement of the extrusion head with respect to the base is performed under computer control. For effective extrusion, the cold end should be at a considerably lower temperature than the hot end of the extruder.

Conventional approaches to maintain the lower temperature in the hot end of the extruder rely on air cooling the cold end by placing a fan beside the cold end. However, air cooling is not very efficient as the heat capacity of air is less, and is even ineffective when hot end temperatures are very high (>260° C.). Further, the air cooling may only cool the cold end to the ambient temperature that may not be effective, for example when used it in heated environments.

Conventionally, water-cooled extruders have been built to counter above problem and to sustain higher hot end temperatures, but they are also very ineffective, as they simply replace air with water as the coolant. In the conventional water-cooled extruders, water simply flows around the cold end to absorb heat. In the conventional extruders, the amount of heat transfer is limited, although it is higher than air-cooled extruders. Further, the water cooled conventional approaches does not perform well in higher ambient temperatures that are required for depositing high melt temperature materials, since the cold end may absorb heat from the ambient.

Therefore, there is a need for an improved extruder or dispenser that can solve above mentioned problems associated with conventional extruders/dispensers.

SUMMARY

According to an aspect of the present disclosure, a dispenser (100) for printing is provided herein. The dispenser (100) includes a material feed portion (108) configured to provide a printing material. The dispenser (100) further includes a cold end portion (104) configured to cool down temperature of the printing material. The dispenser (100) further includes a coolant source (304) configured to use a liquid as coolant, and provide cooling to the printing material. The dispenser (100) further includes a hot end portion (102) configured to convert printing material into a molten form and output the printing material for printing via a dispenser outlet (116). It may be noted that the material can be in any form or shape or size such as with circular filament cross section, rectangular tape cross section etc.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1:
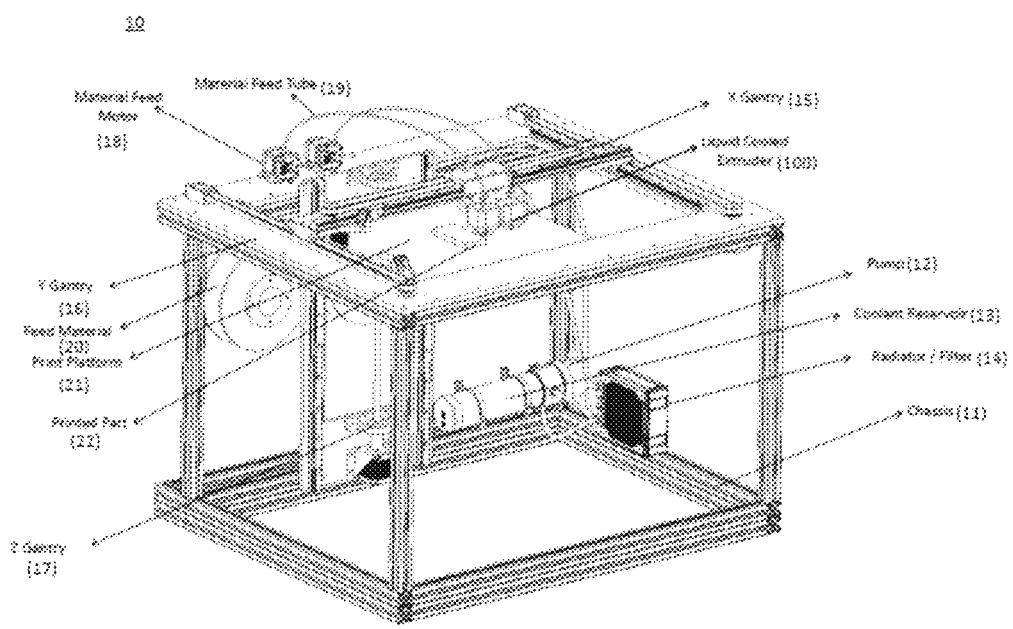
FIG. 1 illustrates an embodiment of a printer, according to an embodiment of the present invention.

FIG. 1 illustrates a schematic representation of a printer 10. As shown in FIG. 1, the printer 10 includes a chassis 11, a pump 12, a coolant reservoir 13, and a radiator/filter 14. The printer 10 further includes X gantry 15, Y gantry 16, and Z gantry 17. The printer 10 further includes material feed motor 18, material feed tube 19, and feed material 20. The printer 10 further includes print platform 21 and printed part 22 as output. According to an embodiment of the present invention, the printer 10 further includes a liquid cooled extruder 100.

Figure 2:
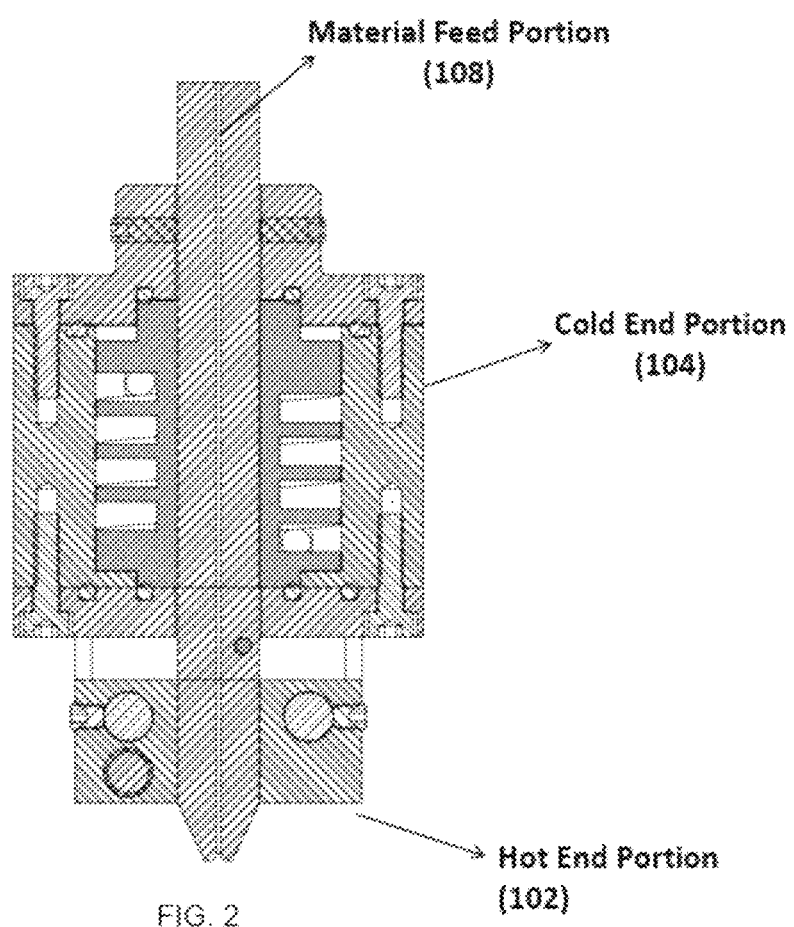
FIG. 2 illustrates the cross-section of a dispenser, according to an embodiment of the present invention.

FIG. 2 illustrates a schematic representation of the liquid cooled extruder/dispenser 100. As shown in FIG. 2, the dispenser 100 includes a hot end portion 102, a cold end portion 104, a coolant source 304 (not shown in FIG. 2), and a material feed portion 108.

Figure 3:
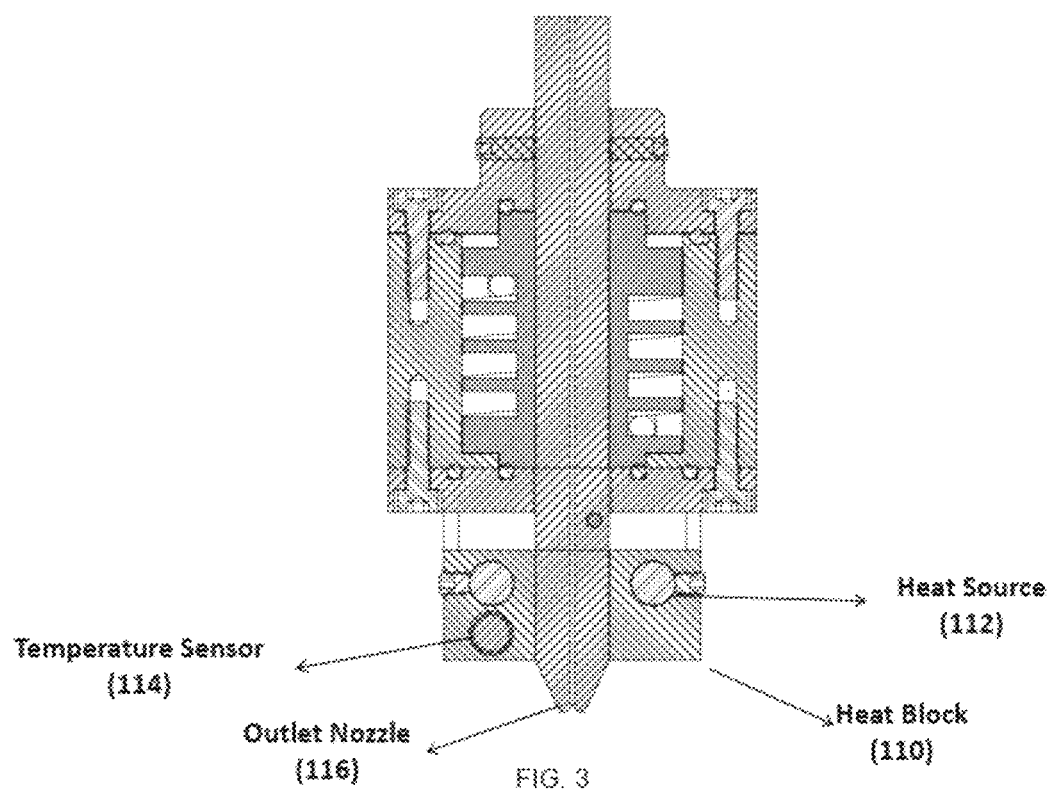
FIG. 3 illustrates the cross-section of a dispenser illustrating hot end portion of the dispenser, according to an embodiment of the present invention.

FIG. 3 illustrates a schematic representation of hot end portion 102 of the dispenser 100. According to an embodiment of the present disclosure, the hot end portion 102 is area of dispenser where the printing material (for example, plastic) is converted to a molten form by heating it to its melting temperature.

As shown in FIG. 3, the hot end portion 102 includes a heat block 110 that is configured to melt the printing material. In an embodiment, the heat block 110 may be made of a material with high thermal conductivity (for example, aluminum). Further, the heat block 110 includes provision for the attachment of the other hot end components. The hot end portion 102 further includes a heat source 112 that is configured to provide the source of heating for melting the material in the heat block 110. In an embodiment, the heat source 112 may be a resistance heating cartridge with enough power to take the heat block to the required temperatures like 450 C for high performance materials like PEEK, ULTEM.

Further, in an embodiment, the hot end portion 102 includes a temperature measuring unit 114 that is configured to measure the temperature of the heat block and sends the value to a controller. The controller is configured to maintain the temperature of the heat block to the set value. In an embodiment, the temperature measuring unit 114 may be a thermocouple which is capable of measuring high temperatures up to 900 degree Celsius. The hot end portion 102 further includes a nozzle 116 that is configured to act as an outlet for the molten plastic. In an embodiment, the nozzle 116 may be a dispensing/dispenser outlet with required outlet cross section based on the size and form of the raw material to be deposited. Further, the dispensing outlet may be made of a thermally conductive material (for example, brass for uniform heating). In another embodiment, the nozzle may be swapped to handle different fibre types, size and cross section.

The hot end portion 102 further includes a portion of the material passage insert 127. In an embodiment, the insert 127 is configured to connect the hot end portion 102 to the cold end portion 104. In another embodiment, the insert 127 is directly connected to the material feed portion 108. The insert 127 may be made up of a combination of material with the part that is in the hot end made of highly conductive material like aluminum. The part between the hot end and cold end can be made of material with very low thermal conductivity (for example, titanium, ceramic) to restrict the heat transfer from the hot end portion 102 to the cold end portion 104. And finally the part in the cold end can be made of highly conductive materials like aluminum to efficiently transfer heat from the insert into the core.

Further, in an embodiment, the hot end portion 102 includes a thermal jacket 120 (not shown in figure) that is configured to act as an insulating layer over the heat block 110 to prevent heat loss to the ambient. In an embodiment, the heat block 110 may be covered by the thermal jacket 120. The thermal jacket 120 may be made of an insulating material to reduce heat loss to the ambient environment. Those skilled in the art will appreciate that the heat block 110 may be swapped with a different material for higher thermal conductivity and for handling other varieties of temperature sensors and heating units.

Figure 4:
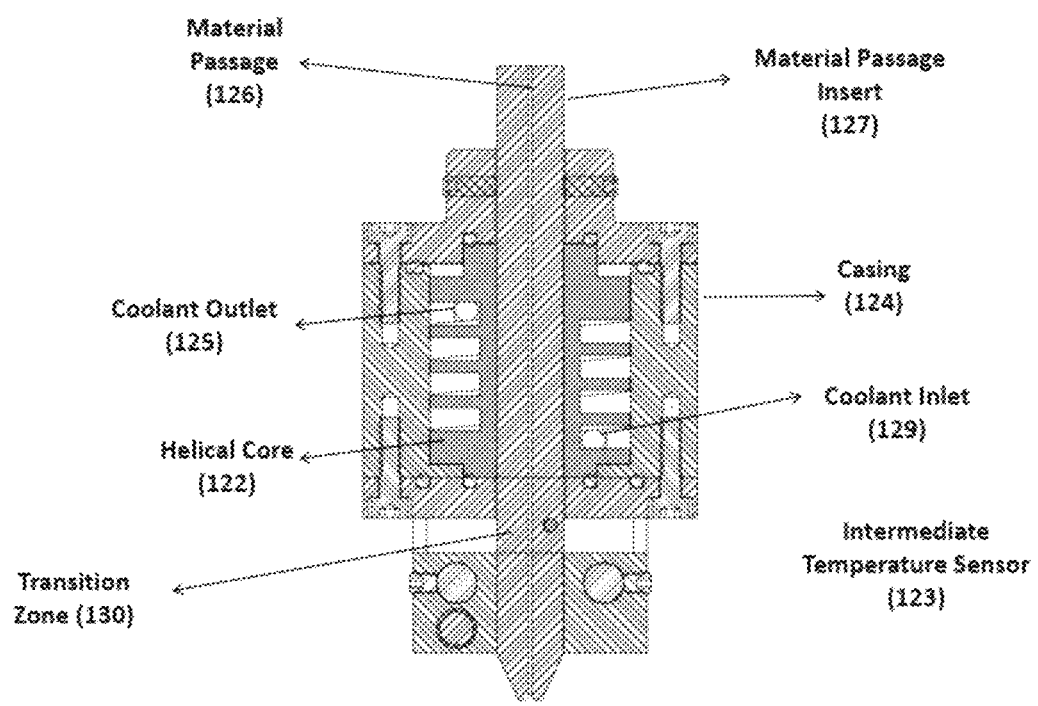
FIG. 4 illustrates the cross-section of a dispenser illustrating cold end portion of the dispenser, according to an embodiment of the present invention.

FIG. 4 illustrates a schematic representation of cold end portion 104 of the dispenser 100. According to an embodiment of the present disclosure, the cold end portion 104 is configured to keep the printing material cool and prevent the material from prematurely melting away from dispenser outlet.

In an embodiment, the cold end portion 104 includes a core 122 and a casing 124, as shown in FIG. 4. In an embodiment, the core 122 of the cold end portion 104 has a conduit 126 for the raw material to pass through it. Further, the cold end portion 104 is subjected to the heat from the hot end portion 102 due to its proximity. According to an embodiment of the present invention, this heat is transferred through the material passage insert 127 between the hot end portion 102 and the cold end portion 104.

In an embodiment, the core 122 and the casing 124 are made from different materials. Further, the casing 124 is insulated or is made of insulated material to restrict heat transfer from the ambient into the core.

Further, the cold end portion 104 is provided with an active cooling mechanism. The coolant enters the hot end (102) through the coolant inlet port (129). In an embodiment, outside of the core 122 is configured to serve as passage for coolant flow to maintain low temperature. After flowing around the core the coolant exits through the coolant outlet port (125). In an embodiment, the coolant may be any fluid with high heat capacity. Those skilled in art will appreciate that higher surface area contact with the coolant is required for effective heat transfer.

Further, parts in contact with the insert 127 may be made of a material with higher thermal conductivity to transfer heat effectively to the surface of the core. Furthermore, parts in contact with the ambient (for example, the casing 124) may be made of an insulating material to restrict transfer of heat from the ambient. According to an embodiment of the present invention, all heat transferred to the cold end portion 104 from the hot end portion 102 is dissipated to the coolant. Further, the heat from the ambient is not allowed to enter into the cold end portion 104.

Figure 5:
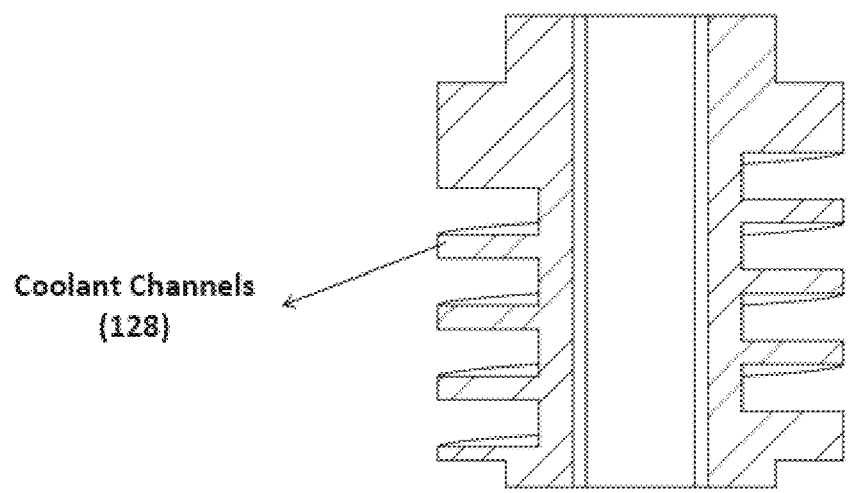
FIG. 5 illustrates the cross-section of the helical core illustrating channels, according to an embodiment of the present invention.
Figure 6:
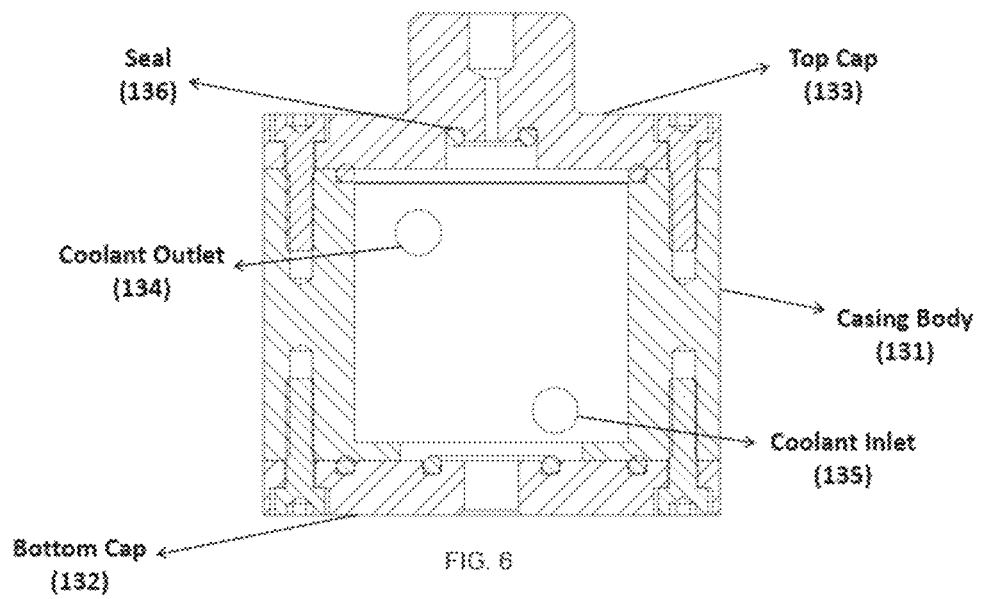
FIG. 6 illustrates the cross-section of the casing of a dispenser, according to an embodiment of the present invention.

Further, in an embodiment, the core 122 is a helical core, i.e., the core 122 is helical shaped, as shown in FIG. 5. In an embodiment, geometry of the channels 128 in the elical core is configured to affect the area of contact of the core 122 with the coolant, and the coolant's residence time inside the casing 124, thereby affecting the efficiency of cooling. Those skilled in art will appreciate that the helical core geometry, as shown in FIG. 6, will provide helical flow to the coolant, thereby providing a high area of contact and high residence time for the coolant liquid to absorb maximum heat and increasing efficiency of cooling. The helical cooling ensures the material stays within or below the melting point at any part above the heat block. In a preferred embodiment, the dispenser is further connected with the pump 12 that can control the flow rate of the coolant in the helical core 122 to maintain the temperature of the print material below the melting temperature above the heat block. The pump may control the flow rate on the basis of feedback received from an intermediate temperature sensor 123 that may be placed in the material passage insert in the transition zone 130 and the temperature sensor 123 is in communication with the pump and communicates the latest temperature of the transition zone to the pump that controls the flow rate on basis of a set melting point.

Those skilled in the art will appreciate that the two-part system of the core 122 and the casing 124 serves two purposes. First, it makes the manufacturing of the channels for the helical flow easier and more economical. Secondly, it allows to use different materials for the core and the casing. In an embodiment, the casing 124 includes a body, top cap, a bottom cap, water inlet, water outlet, and seals, as shown in FIG. 6. The casing 124 is configured to serve as a jacket for the cold end portion 104 and keeps the coolant from coming out of the cold end portion 104. Further, the casing 124 is configured to eliminate heat transfer between the cold end portion 104 and the external environment which may be at high temperatures for processing some materials.

Figure 7:
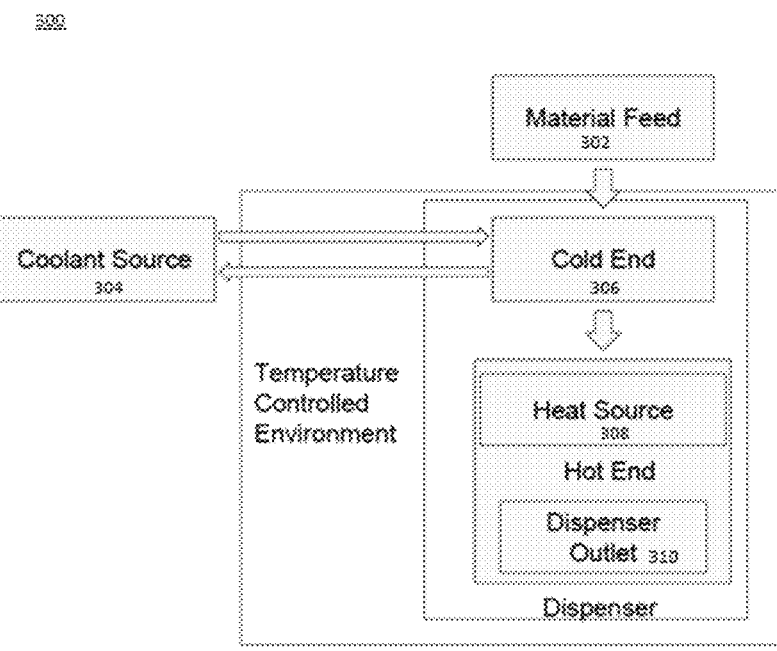
FIG. 7 illustrates a flowchart of a method of cooling a dispenser by a liquid, according to an embodiment of the present invention.

Further, the coolant source 304 as shown is FIG. 7 of the dispenser 100 may contain the coolant at the optimal condition, for example, appropriate temperature, pH, and purity. Further, the coolant source 304 may have coolant delivery mechanism which may include a pump, and the inlet/outlet piping. In an embodiment, the dispenser 100 is configured to pass the coolant through the cold end portion 104.

Figure 8:
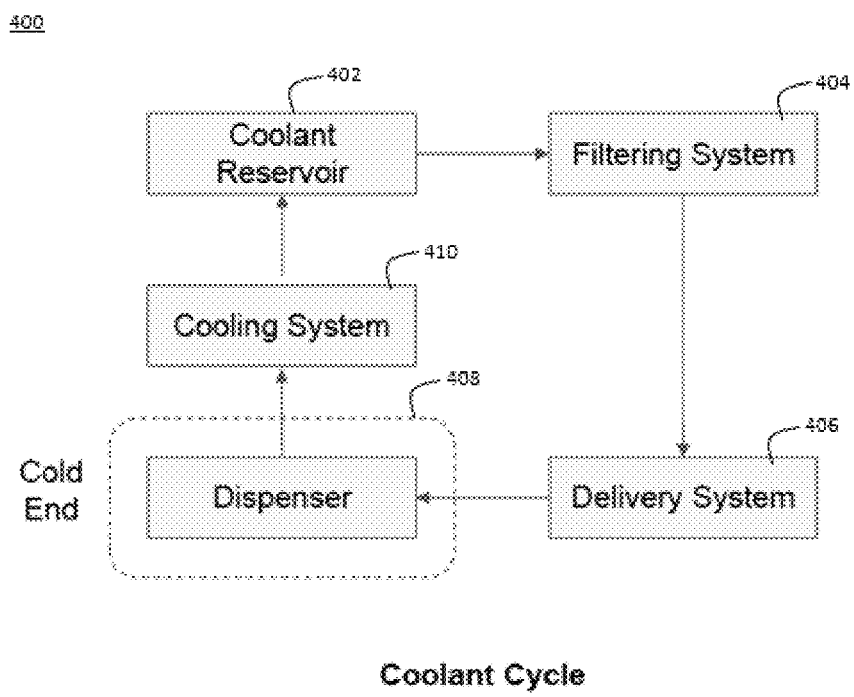
FIG. 8 illustrates a flowchart of a method of recycling liquid coolant for a dispenser, according to an embodiment of the present invention.

FIG. 8 illustrates the coolant cycle. The coolant source 304 is configured to maintain the required coolant flow rate by the use of a control mechanism (for example, a flow control valve) in the delivery system 406. Further, the cooling system 410 that is configured to remove heat from the coolant, may be an active or passive system to maintain a lower coolant temperature, which may include radiators, thermoelectric coolers etc. Further, the filtering system 404 is configured to remove any contaminants that might enter into the coolant cycle. Further, the material feed portion 108 is configured to provide material to facilitate printing (for example, 3D printing).

Figure 9:
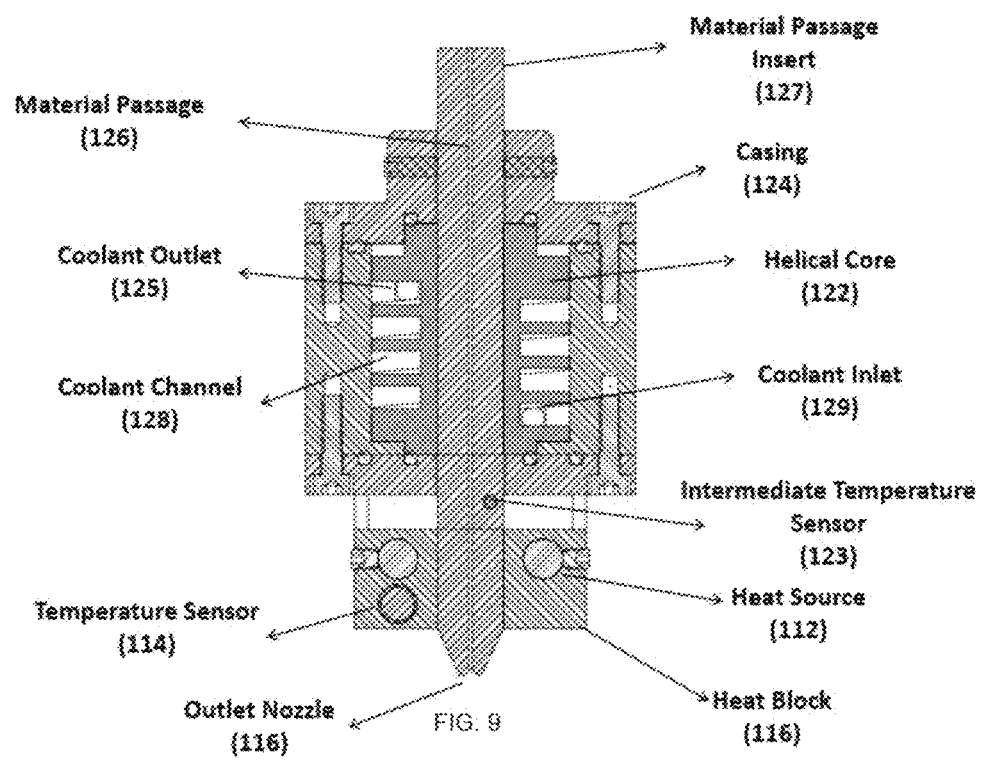
FIG. 9 shows the cross section of the complete dispenser, according to an embodiment of the present invention.

Further, according to an embodiment of the present invention, the dispenser 100 is configured to securely mount to the machine (for example, printing head) with proper alignment and quick release mechanism. In an embodiment, the quick release mechanism is configured to allow for quick assembly/disassembly of the dispenser 100 for maintenance. Further, in an embodiment, the pipes may be connected to the dispenser 100 and the pipes may use pneumatic connectors for quick release for fast assembly and disassembly. Further, in an embodiment, the electric wires for the heater and the temperature sensor may also be connected by snap on connectors. Further, in an embodiment, material passage insert 127, can be easily separated from the dispenser and replaced with alternative insert and heat block with a different cross section for the passage and the outlet, as shown in FIG. 9. Those skilled in art will appreciate that this enables to use the same dispenser and machine to deposit raw materials with different cross section and size.

Figure 10:
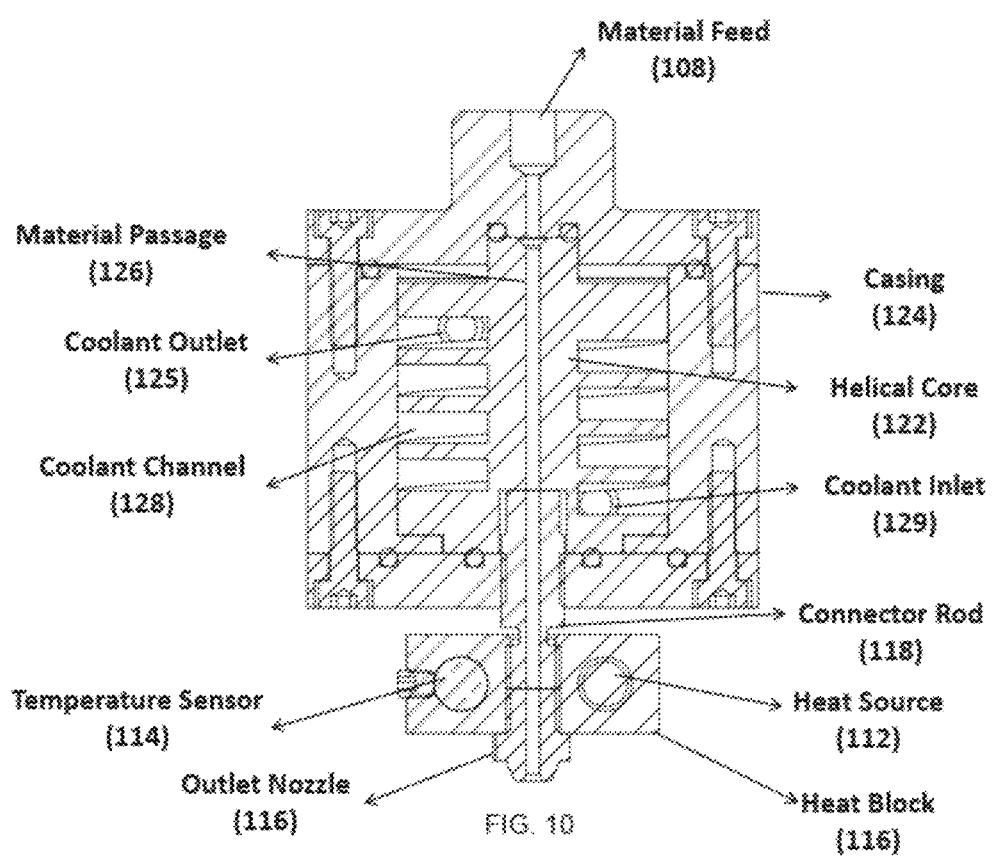
FIG. 10 shows an alternative embodiment for fixed cross section of raw material, according to an embodiment of the present invention.

FIG. 10 shows another embodiment which may be used to deposit fixed cross section of raw material where a connecting rod 118 is configured to join the hot end to the cold end. In an embodiment, the connector rod may be made of a thermally insulating material like titanium to prevent heat transfer from the hot end to the cold end. In this configuration the cross section of the raw material is fixed and cannot be changed.

The dispenser 100 advantageously provides advanced cooling that may be used in three-dimensional (3D) printing apparatus. The dispenser 100 is capable of attaining higher extrusion temperatures in a more efficient and effective manner by using liquid coolant (instead of air used by conventional dispensers). Further, the dispenser 100 advantageously ensures effective heat transfer, as the water starts to flow from the bottom of the core which is the hottest region and exits at the top of the core which is relatively less hot while maintaining a helical trajectory. Those skilled in art will appreciate that this ensures maximum heat transfer as cold water comes in contact with the hottest part of the core and has a high surface contact with the core.

Further, cooling effect provided by the dispenser 100 allows a relatively shorter core 122 in the cold end portion 104, and hence a shortened cold end portion 104. Further, the dispenser 100 provides for faster deposition rates/higher printing speeds because more heat can be supplied to the hot end. Further, since the cold end is shortened, the chances of choking of the printing nozzle due to creep failure are minimized. Further, because of effective heat transfer, the cooling dispenser is more economical due to the requirement of a lower pressure pump. Further, the insulated outer wall of the cold end portion is configured to prevent transfer of heat to the printing material from the ambient in case of printing in an elevated ambient temperature which can be required for high performance thermoplastics like PEEK, PEI amongst others. This keeps the core of the dispenser cooler even when printing in high temperatures.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A dispenser, comprising:
    a material feed portion configured to provide a printing material;
    a coolant source, wherein the coolant source comprises a coolant;
    a cold end portion, wherein
        the cold end portion comprises a helical core having a conduit,
        the coolant from the coolant source passes through the conduit of the helical core to cool down a temperature of the printing material,
        the helical core of the cold end portion is configured to:
            receive the coolant from a bottom of the helical core of the cold end portion, and
            maintain a helical flow of the coolant in the helical core of the cold end portion and exits the coolant from a top of the helical core;
    a hot end portion; and
    a material passage insert, wherein
        the hot end portion and the cold end portion is a two-piece structure joined together through the material passage insert, wherein
            a first part of the material passage insert is in the hot end portion and made of aluminium, a second part of the material passage insert is lying between the cold end portion and the hot end portion, the second part of the material passage insert is made up of a material with thermal conductivity to restrict the heat transfer from the hot end portion to the cold end portion, and a third part of the material passage insert is in the cold end portion, the third part of the material passage insert is configured to transfer a heat from the material passage insert into the helical core of the cold end portion.

2. The dispenser of claim 1, wherein the hot end portion is configured to convert the printing material into a molten form and output the printing material for printing via a dispenser outlet.

3. The dispenser of claim 1, wherein the hot end portion comprises a connector rod configured to connect the hot end portion with the cold end portion.

4. The dispenser of claim 1, wherein the hot end portion comprises a heat block configured to melt the printing material.

5. The dispenser of claim 4, wherein the hot end portion comprises a thermal jacket configured to cover the heat block.

6. The dispenser of claim 2, wherein the dispenser outlet is a nozzle configured to handle a plurality of sizes and cross sections of raw material.

7. The dispenser of claim 6, wherein the nozzle is swappable.

8. The dispenser of claim 1, wherein the hot end portion comprises a temperature measuring unit configured to measure a temperature of a heat block.

9. The dispenser of claim 1, wherein the helical core is configured to increase an area of contact of the helical core with the coolant, and increase efficiency of cooling.

10. The dispenser of claim 1, wherein the cold end portion comprises a casing configured to serve as a jacket for the cold end portion.

11. The dispenser of claim 1, further comprises a pump to control a flow rate of the coolant in the helical core.

12. The dispenser of claim 11, further comprises a temperature sensor in a transition zone wherein the temperature sensor is in communication with the pump to control the flow rate based on a required temperature of the printing material.

13. The dispenser of claim 12, wherein the temperature or the printing material is below a melting point above the heat block.

* * * * *